UNITED STATES PATENT OFFICE.

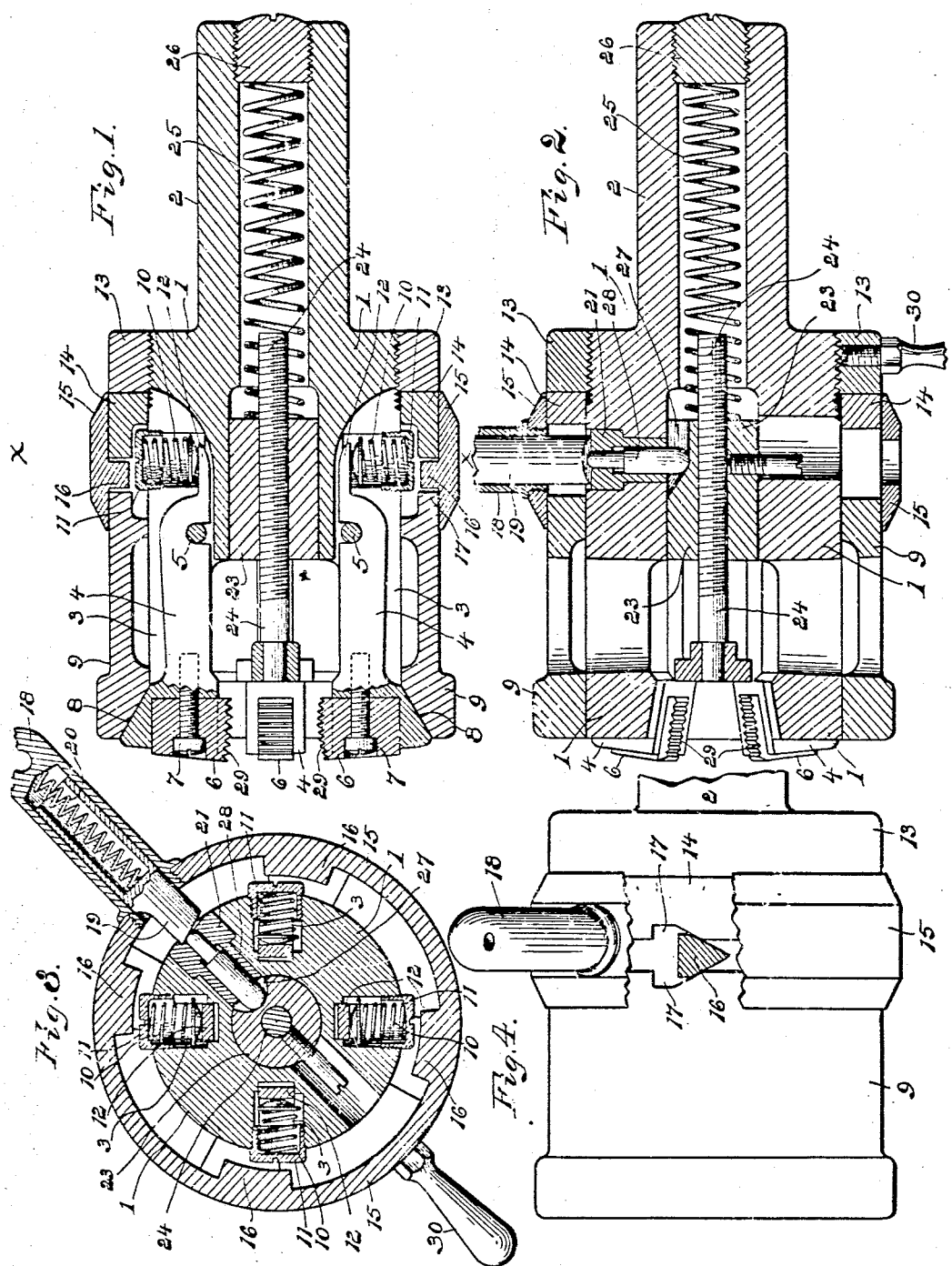

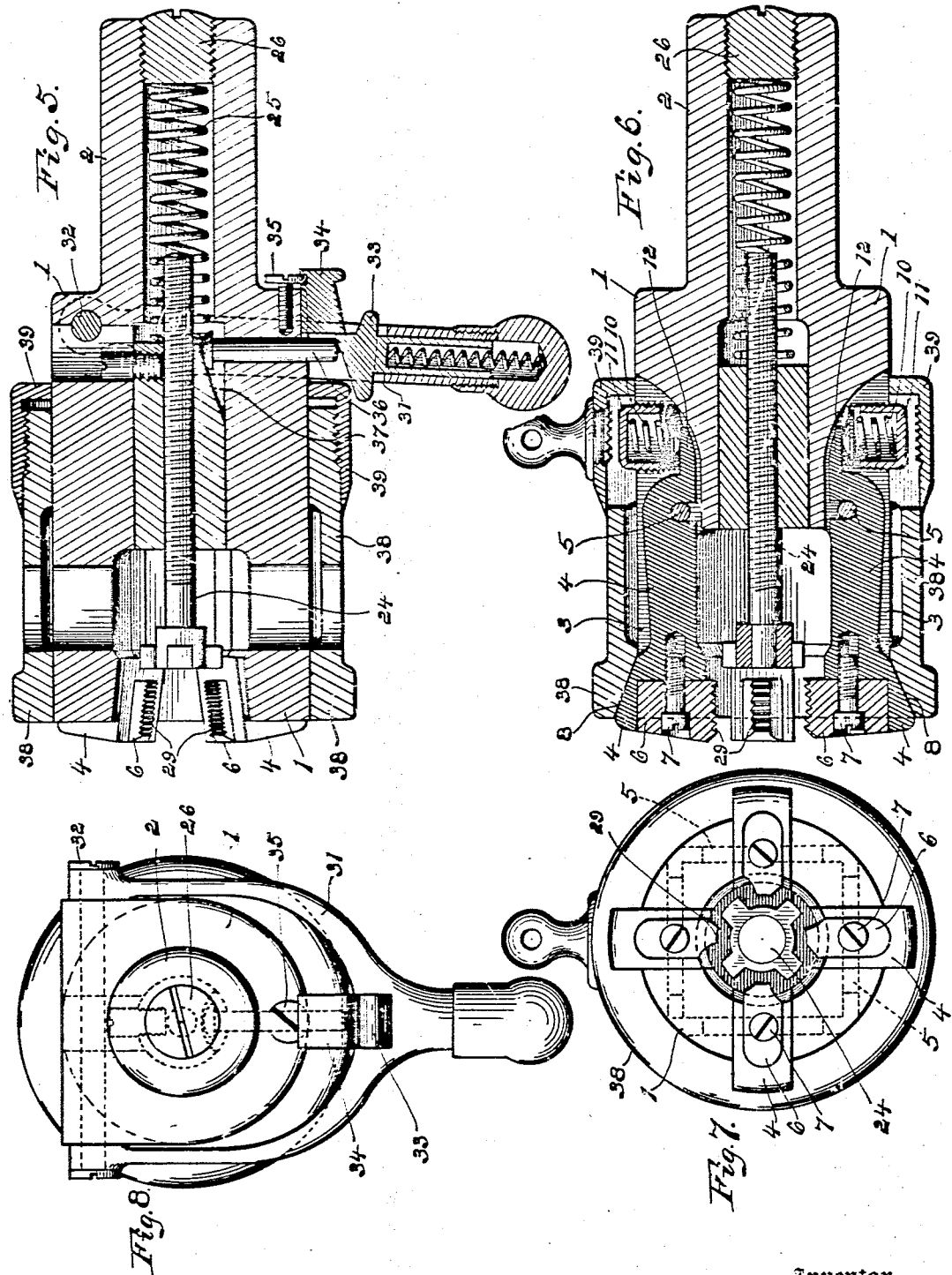

JOSEPH P. LAVIGNE, OF DETROIT, MICHIGAN.

AUTOMATIC DIE-HEAD.

966,105.  Specification of Letters Patent.  Patented Aug. 2, 1910.

Application filed June 20, 1908.  Serial No. 439,522.

*To all whom it may concern:*

Be it known that I, JOSEPH P. LAVIGNE, a citizen of the United States of America, residing at Detroit, in the county of Wayne and State of Michigan, have invented certain new and useful Improvements in Automatic Die-Heads, of which the following is a specification, reference being had therein to the accompanying drawings.

This invention relates to die heads for turret lathes, screw machines and the like, and especially to means therein whereby work engaged by the die is released at the end of the cutting movement and may be withdrawn without contact with the dies.

The invention consists in the matters hereinafter set forth, and more particularly pointed out in the appended claims.

In the drawings, Figure 1 is a view in longitudinal, central section of a die head embodying features of the invention. Fig. 2 is a view in longitudinal section taken at right angles to Fig. 1. Fig. 3 is a view in transverse section on line $x$—$x$ of Fig. 1. Fig. 4 is a view in elevation, parts being broken away to show the cam block in section, the die head being in closed position. Fig. 5 is a view in longitudinal section of a modified form of die head embodying the invention. Fig. 6 is a similar view at right angles to Fig. 5. Fig. 7 is a view of the face of modified form of head. Fig. 8 is a view of the back end of the modified form of head.

Referring to the drawings, 1 indicates a cylindrical body with an axial stem 2 extending from its rear end whereby it may be held in the chuck or mandrel of a machine in which it is used. The body is axially apertured and a plurality of symmetrically disposed longitudinal guide slots 3 are formed in its periphery in which die holding jaws 4 are secured to move in and out transversely to the die axis. Preferably the jaws are oscillatory and are removably secured in the guide slots by pins 5 engaging transverse grooves near the inner ends of the jaws. Die plates 6 are inset and secured in the outer extremity of the jaws as by screws 7 or the like. Each jaw has an outer oblique cam face 8 which bears against the countersunk, inner face of a tubular casing 9 longitudinally reciprocable on the body 1, the jaws being projected against the casing by springs 10 in compression between screw caps 11 inserted in the face of the body 1 and reduced end portions 12 on the jaws.

A stop collar 13 is screw-threaded on or otherwise adjustably secured to the rear end of the body 1 and confines a cam ring 14 whose outer annular face abuts the inner end of the casing 9 when the die head is open. A locking collar 15 is rotatably mounted to lap the joint between the casing 9 and cam ring 14 and carries a plurality of wedge-shaped lugs 16 which project into registering V-notches 17 cut in the adjacent faces of the casing and cam ring. A suitable handle 18 projects from the collar; a latch 19 longitudinally reciprocable in the bore of the handle 18 is held projected by a suitably disposed spring as 20 and locks the collar against rotation by engaging a suitable notch in the periphery of the body 1, the latter being preferably formed in an inset hardened bushing 21.

A bushing 23 is longitudinally reciprocable in the axial aperture of the body 1 and a trip rod 24 is longitudinally adjustable through the bushing as by screw-threaded engagement therewith, and is normally projected toward the outer end of the die head by a spring 25 in compression between the bushing and a screw-plug 26. A longitudinal groove 27 in the bushing 23 has an inclined base which cams against the rounded end of a trigger pin 28. The latter is longitudinally reciprocable in the latch bushing 21 and abuts the inner end of the latch plug 19.

The die plate 6 has screw-threads or cutting teeth 29 which I dispose on an arc so that the rocking of the jaws does not bring unequal wear upon either the heel or the front end of the plates.

In operation, the casing 9 and cam ring 14 are spread by rotation of the collar and its wedge lugs 16 until the latch locks the collar against retrograde movement. The consequent forward projection of the casing 9 closes the jaws toward each other by the camming action on their oblique ends, adjustment to proper diameter being made by a shifting of the collar 13 which itself is locked in position by a suitable set-screw 30. When the rod or object to be threaded is passed into the die, it encounters the trip rod 24 and presses it back, thereby releasing the latch 19 by projection of the trigger pin 28. As a result, the compressed jaw springs force the jaws outwardly, moving the casing back and wedging the lock collar around in open position, after which the work may be withdrawn, the die head reclosed and the operation repeated.

In a modified form shown in Figs. 5 to 8 inclusive, the stop collar is replaced by a yoke 31 embracing the rear end of the body on which it is pivoted on a cross pin 32; the yoke carries a spring projected latch 33 engaging an adjustable block 34 secured as by a screw 35 in the body 1. A trip pin 36 is moved in and out by engagement with a cam slot 37 in the bushing which carries the trip rod 24, a casing 38 whose engagement with the jaws 4 is like that of the other construction and reciprocable on the body 1, adjustment of its throw being provided for by a stop collar 39 screw-threaded onto its rear end. The screws which retain the spring jaws are housed by this ring as in the former construction and the operation is substantially the same.

One feature of the invention is the complete housing of the jaws and other moving parts so that flying chips, dirt and dust cannot get into the die head. Another advantage is the compactness of the head so that it can be used in restricted spaces. A very great advantage is the fact that the work can be withdrawn without running back through the die plates and as this movement can be made very rapidly there is a great saving of time. As the result of this release of the work the life of the die plates is greatly prolonged and they do not have to be reground as frequently because the work only is engaged by them when moving in a forward normal relation thereto.

Obviously the details of construction herein shown may be varied without departing from the spirit of the invention and I do not care to limit myself to any particular form or arrangement of parts.

What I claim as my invention is:—

1. An automatic die head comprising an axially apertured, cylindrical body having peripheral, longitudinal slots, a die-carrying jaw oscillatory in each slot provided with an inclined cam face on its outer extremity, a spring adapted to yieldingly project the cam face of the jaw beyond the body periphery, a cylindrical casing longitudinally reciprocable on the body having a countersunk inner face sliding over the jaw cam faces, a stop collar limiting the movement of the casing in the body, members rotatable on the body adapted to move the casing against the jaw cam faces, a latch adapted to interlock the members and the body when the jaws are closed, and means for tripping the latch yieldingly projected through the body aperture into the path of work advancing through the jaws.

2. An automatic die head comprising an axially apertured cylindrical body having peripheral, longitudinal slots, a die-carrying jaw movable in each slot provided with an inclined cam face on its outer extremity, a spring adapted to yieldingly project the cam face of the jaw beyond the body periphery, a cylindrical casing longitudinally reciprocable on the body having a countersunk inner face sliding over the jaw cam faces, a stop-collar limiting the movement of the casing on the body, a cam ring on the body between the casing and the stop collar, a locking ring rotatable on the casing and cam ring provided with wedge lugs entering corresponding apertures formed by mating notches in the proximate faces of the casing and cam ring, a latch thereon adapted to interlock the locking collar and body when the casing and cam ring are spread apart, and means for tripping the interlocking means yieldingly projected through the body aperture into the path of work advancing through the jaws.

3. An automatic die head comprising an axially apertured cylindrical body having peripheral, longitudinal slots, a die carrying jaw movable in each slot provided with an inclined cam face on its outer extremity, a spring adapted to yieldingly project the cam face of the jaw beyond the body periphery, a cylindrical casing longitudinally reciprocable on the body having a countersunk inner face sliding over the jaw cam faces, a stop-collar limiting the movement of the casing on the body, a cam ring on the body between the casing and the stop collar, a locking ring rotatable on the casing and cam ring provided with wedge lugs entering corresponding apertures formed by mating notches in the proximate faces of the casing and cam ring, a latch thereon adapted to interlock the locking collar and body when the casing and cam ring are spread apart, a latch pin adapted to trip the latch, a bushing reciprocable in the body aperture adapted to operate the pin, a trip rod longitudinally adjustable in the bushing, and a spring adapted to yieldingly project the bushing and rod toward the jaws.

In testimony whereof I affix my signature in presence of two witnesses.

JOSEPH P. LAVIGNE.

Witnesses:
C. R. STICKNEY,
A. M. DORR.